United States Patent
Hannah

[11] Patent Number: 5,984,401
[45] Date of Patent: Nov. 16, 1999

[54] PANEL ATTACHMENT MEMBER AND SYSTEM

[76] Inventor: James David Hannah, 8455 Willow Grove Rd., Allons, Tenn. 38541

[21] Appl. No.: 08/917,996

[22] Filed: Aug. 25, 1997

[51] Int. Cl.⁶ ............................. B60R 27/00; F16B 47/00
[52] U.S. Cl. ......................... 296/136; 296/191; 296/212; 248/205.9; 248/309.3; 280/770
[58] Field of Search ..................................... 296/136, 191, 296/152, 212; 280/770; 293/128; 248/309.3, 362, 363, 205.5, 205.7, 205.8, 205.9, 206.2; 150/166

[56] References Cited

U.S. PATENT DOCUMENTS

| | | | |
|---|---|---|---|
| 2,936,139 | 5/1960 | Lindstrom | 248/24 |
| 2,940,720 | 6/1960 | Birr | 248/309 |
| 3,059,952 | 10/1962 | Wittman et al. | 292/288 |
| 3,593,983 | 7/1971 | Csenyi | 269/21 |
| 3,649,069 | 3/1972 | Zip | 296/97 D |
| 3,878,573 | 4/1975 | Boudewyn | 5/328 |
| 3,976,024 | 8/1976 | Fillery | 114/203 |
| 4,041,999 | 8/1977 | Miller | 150/52 K |
| 4,090,379 | 5/1978 | Lehner | 70/455 |
| 4,376,546 | 3/1983 | Guccione et al. | 280/770 |
| 4,530,519 | 7/1985 | Marshall | 280/770 |
| 4,531,560 | 7/1985 | Balanky | 150/52 K |
| 4,597,153 | 7/1986 | Zaydel | 29/434 |
| 4,707,008 | 11/1987 | Falco | 293/128 |
| 4,862,944 | 9/1989 | Hendershot | 160/370.2 |
| 4,945,935 | 8/1990 | Su | 135/88 |
| 4,952,006 | 8/1990 | Willey | 296/91 |
| 4,952,007 | 8/1990 | Shahrokh | 296/95.1 |
| 4,953,909 | 9/1990 | Crane | 296/136 |
| 5,044,688 | 9/1991 | Jacobsen | 296/136 |
| 5,050,925 | 9/1991 | Brown | 296/136 |
| 5,231,948 | 8/1993 | Malmanger et al. | 114/201 R |
| 5,312,145 | 5/1994 | McNeil | 293/128 |
| 5,358,291 | 10/1994 | Malmanger et al. | 292/175 |
| 5,490,707 | 2/1996 | De La Cruz | 296/95.1 |
| 5,605,369 | 2/1997 | Ruiz | 296/136 |
| 5,715,876 | 2/1998 | Burt | 141/86 |
| 5,820,201 | 10/1998 | Jabalee | 298/136 |

*Primary Examiner*—D. Glenn Dayoan
*Assistant Examiner*—Paul Chenevert
*Attorney, Agent, or Firm*—Luedeka, Neely & Graham, P.C.

[57] ABSTRACT

A panel attachment member and system for shielding a vehicle in an off-road setting. The panel includes an exterior portion and an interior portion. A lip is disposed around the interior portion. A magnetic cut-out is attached to the lip for magnetically securing the panel to the vehicle. Moreover, at least one suction cup is disposed on the interior portion for further securing the panel to the vehicle via vacuum pressure contained within the suction cup. A valve is attached to the suction cup for releasably securing the panel to the vehicle.

5 Claims, 2 Drawing Sheets

PANEL ATTACHMENT MEMBER AND SYSTEM

FIELD OF THE INVENTION

The present invention relates generally to the attachment of panels to surfaces and to devices for protecting the finish of a vehicle. More particularly, the invention relates to a panel attachment member and system for protecting the finish of off road vehicles from damage such as dents, scratches, and abrasions.

BACKGROUND AND SUMMARY

Vehicle manufacturers have recently experienced a high demand for vehicles capable of traversing an off-road setting such as four-wheel drive sport utility vehicles. Sport utility vehicles, while of rugged construction, have recently become more luxurious and often are provided with paint finishes in the nature of luxury automobiles. Thus, when the vehicle is used in off-road settings such as for fishing expeditions, camping expeditions, four wheel drive recreation, and the like, there is an enhanced likelihood of damage to this finish. For example, it is common during such use to encounter bushes, tree branches, and off-road debris which tend to scratch, dent or otherwise damage the finish of such vehicles. Current vehicle shielding devices are disadvantageous in that they are difficult to apply to the vehicle, tend to easily dislodge from the vehicle if jarred in the off-road setting, and lack in the degree of protection they offer.

The present invention overcomes many of the disadvantages of the prior art by providing a panel attachment member and system for shielding a vehicle that is more effective and convenient to use as compared to the prior devices. The panel includes an exterior portion and an interior portion, as well as lip disposed around the interior portion. A magnetic cut-out is attached to the lip for magnetically securing the panel to the vehicle. At least one suction cup is disposed on the interior portion for further securing the panel to the vehicle via vacuum pressure contained within the suction cup when applied to the vehicle. Means are further provided for releasably securing the at least one suction cup or member to the vehicle and may be accessed from the exterior portion of the panel. The means for releasably securing the at least one suction cup to the vehicle includes an air valve attached to the at least one suction cup and which is in air flow communication therewith. The air valve preferably comprises a base and valve stem attached to the base. A first air passageway and a plunger is also included. The plunger is disposed in the first air passageway of the air valve. The air valve also comprises a piece that is attached to the plunger and mounted on a spring such that the plunger is spring loaded. The air valve further includes a second air passageway formed in the base and extending through the air valve such that when the plunger is depressed and the piece thereby displaced, the first air passageway is in communication with the second air passageway thereby releasing the vacuum pressure contained within the suction cup. The panel also includes a standoff that is attached to the base at a first end and integrally formed with the exterior portion of the panel at a second end. The standoff preferably surrounds and protects the valve stem. The panel also includes a sealed cover that is attached to the panel and has a first flange and a second flange disposed below the first flange. When installed in the panel, the second flange of the seal cover is disposed in an annular groove contained within the panel and the first flange is used to pry the seal cover off of the panel. The seal cover is for sealing the air valve from the environment. Also preferably, the panel is constructed of a non-porous, non-fibrous plastic material that is preferably Poly Vinyl Chloride ("PVC"). The magnetic cut-out of the present invention also prevents flow of air, seepage of moisture, and other environmental elements from reaching a section of the vehicle to which the panel overlays.

In a further embodiment of the present invention, a system if provided for shielding the vehicle. The vehicle has a plurality of sections and a panel for covering each of the plurality of sections. Each of the panels includes an exterior portion, and an interior portion, a lip disposed around the interior portion, and a magnetic cut-out attached to the lip for magnetically securing the panel to one of the plurality of sections of the vehicle. Also included is at least one suction cup disposed on the interior portion for further securing the panel to one of the plurality of sections of the vehicle via vacuum pressure contained within the suction cup when applied to one of the sections of the vehicle. Also included is at least one magnetic strip attached to each of the plurality of sections of the vehicle not covered by the panel to shield these sections from damage when the vehicle is traversing an off-road environment. Also included are means for releasably securing the at least one suction cup to one of the plurality of sections of the vehicle. The means for releasably securing the at least one suction cup to one of the plurality of sections of the vehicle comprises an air valve attached to the at least one suction cup and which is in air flow communication therewith.

Other objects, features and advantages of the present invention will become apparent by reference to the following detailed description when considered in conjunction with the accompanying drawings.

DETAILED DESCRIPTION

Figure 1:
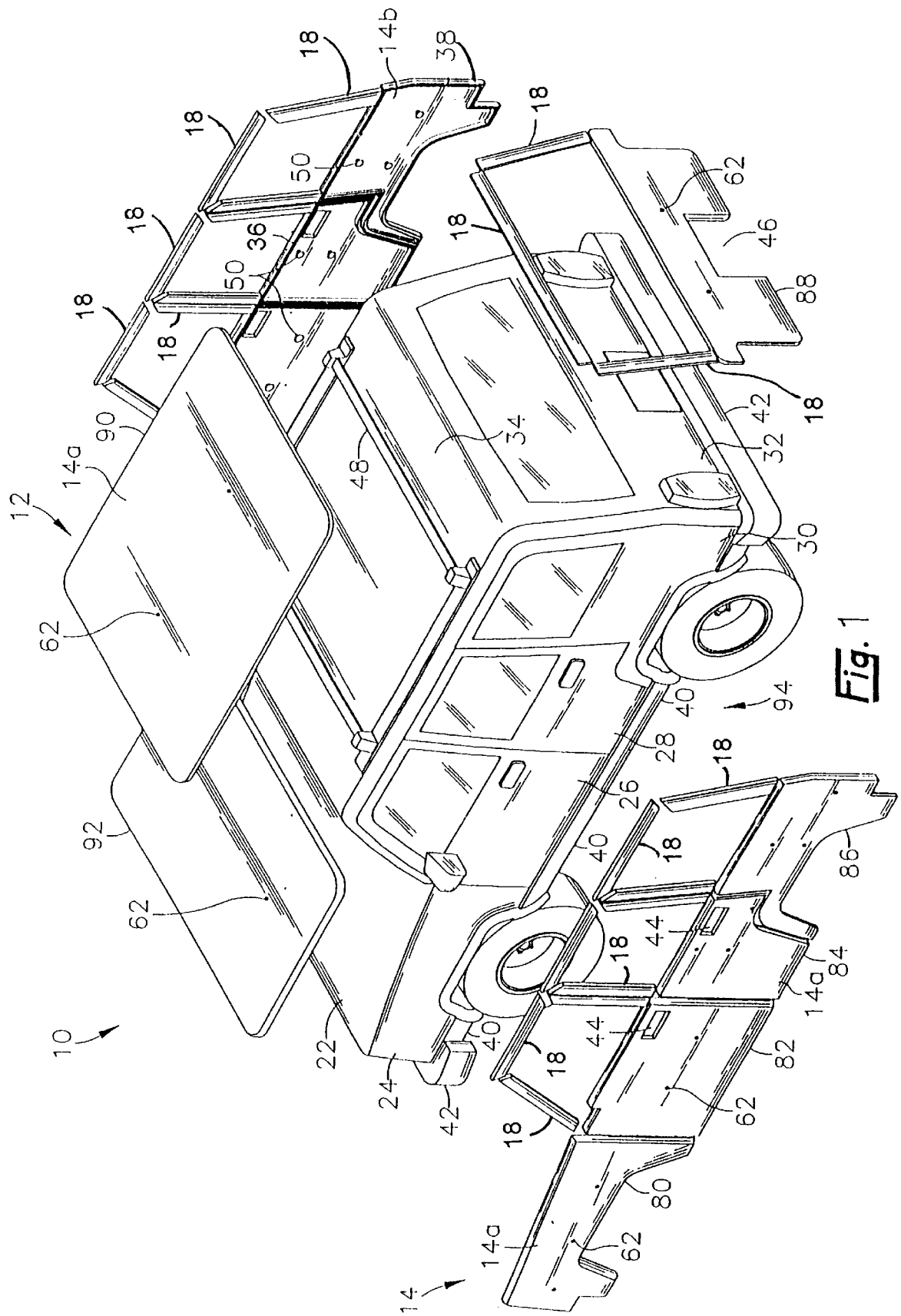
FIG. 1 is a perspective/exploded view of a vehicle, which has a plurality of sections, each of the sections having a shielding panel of the present invention attached thereon.

Commencing with FIG. 1, a system 10 for shielding a plurality of sections 94 of a vehicle 12 is shown. The sections 94 are constructed of sheet metal and contain at least one layer of paint thereon.

Magnetic strips 18 are also provided, and attached to each of the plurality of sections 94 of the vehicle, not covered by the panels 14. The panels 14 and magnetic strips 18 protect the sections 94 of the vehicle 12 from being scratched or dented when the vehicle 12 is traversing an off-road environment. It is also known that some of the panels 14 for shielding the vehicle 12 could also have a key hole aperture disposed therein for inserting a key to access the vehicle 12. Similar panels 14 are disposed on the passenger side of the vehicle 12 and that are a mirror image of the panels 14 disposed on the driver's side.

The panels 13 have an exterior portion 14a and an interior portion 14b. A lip 38 is disposed around the interior portion 14b to which is attached a magnetic cut-out 36 for magnetically securing the panel 14 to one of the plurality of sheet metal sections 94 of the vehicle 12. In addition, the magnetic cut-outs 36 prevent flow of air seepage of moisture, and other environmental elements from reaching the sections 94 of the vehicle 12. The magnetic cut-outs 36 are preferably attached to the lip 38 of the panels 14 via an epoxy.

Running along a lower portion of the vehicle 12 is plastic molding 40, which terminates at either end at bumpers 42 of the vehicle 12. Mounted on a hood 22 of the vehicle 12 is a hood panel 92. A front driver side quarter member 24 is protected by a driver side front quarter panel 80, which has cut-outs for the front bumper 42 and the wheel-well of the vehicle 12. The driver side front door 26 of the vehicle 12 is shielded by a driver's side front door panel 82, which has a door handle aperture 44 for receiving the driver's side front door handle therein. The driver's side rear door 28 of the vehicle 12 is shielded by a driver's side rear door panel 84. The rear driver's side quarter member 30 of the vehicle is shielded by a driver's side rear quarter panel 86, which has a cut-out for the driver's side rear wheel-well of the vehicle 12. The hatch 32 section of the vehicle 12 is shielded by a hatch panel 88, which has an aperture 46 for receiving a license plate of the vehicle 12 therein.

The vehicle 12 further has a luggage rack 48 mounted on a roof 34 of the vehicle 12. To protect the roof 34 of the vehicle when in an off-road environment, a roof panel 90 is provided and which is attached to the roof of the vehicle between side rails of the luggage rack 48. At least one suction cup 50 or flexible membrane is disposed on the interior portion 14b of each of the panels 14 for further securing the panels 14 to sections 94 of the vehicle 12 via vacuum pressure contained within the section cup 50 when applied to the vehicle 12.

The suction cup 50 is flexible and generally concave in shape and is positionable adjacent a surface of the vehicle such that a lower perimeter of the suction cup conforms to the surface for effecting a suction seal between the surface and the flexible membrane.

Figure 2:
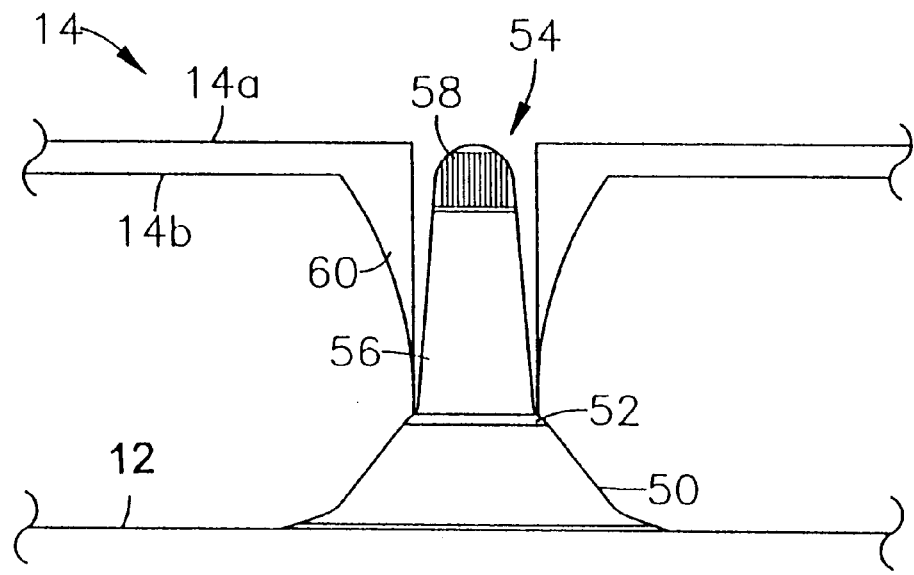
FIG. 2 is a side elevational view of a suction cup, disposed within the panels of the present invention.
Figure 3:
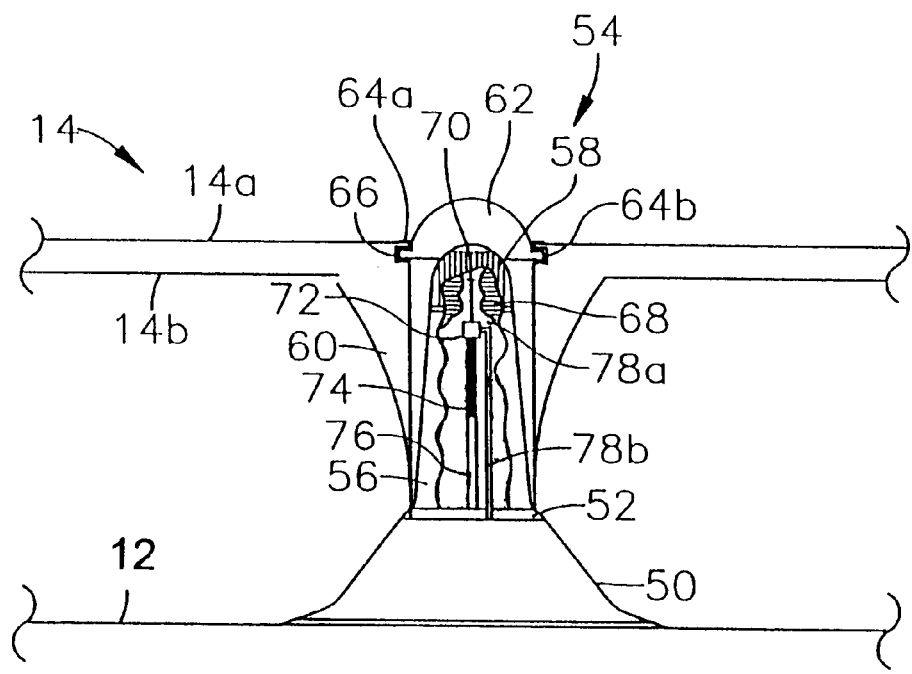
FIG. 3 is a cut away view of the suction cup of the present invention.

The panels 14 further include means for releasably securing the at least one suction cup 50 to the vehicle 12, which may be accessed from the exterior portion 14a of the panel. As shown in FIGS. 2 and 3, the means or attachment member for releasably securing the at least one suction cup 50 to the vehicle 12 includes an air valve 54, which is attached to the at least one suction cup 50 and is in air flow communication therewith. A base 52 is attached to the at least one suction cup and, preferably integrally formed therewith. The air valve 54 is attached to the base 52 and is in air flow communication with the suction cup 50. A valve stem 56 is attached to the base 52 and has a helical thread 68, as shown in FIG. 3, axially opposed to the base for screwingly attaching a cap 58 thereon. The valve stem 56 is flush with, or disposed below, the exterior portion 14a of the panels 14. This prevents a damage from occurring to the air valve 54 when the vehicle 12 is traversing the off-road setting. The air valve 54 further includes a first air passageway 78a around which the helical threads 68 are formed. A plunger 70 is also disposed in the first air passageway, which can be depressed to relieve the vacuum pressure created within the suction cup 50 when applied to the vehicle 12, as will be discussed in further detail below. A piece 72 is attached to the plunger 70 and mounted on a spring 74 such that the plunger 70 is spring loaded.

A member 76 is mounted on the base 52 and attached to the spring 74 in axial opposition to the base 52. It is understood, however, that the member 76 is not necessary in the present invention and the spring 74 could merely be attached to the base 52. The air valve 54 further includes a second air passageway 78b that is formed in the base 52, is in flow communication therewith, and extends through the air valve 54 such that when the plunger 70 is depressed and the piece 72 is thereby displaced, the first air passageway 78a is in communication with the second air passageway 78b thereby releasing the vacuum pressure contained within the section cup 50. When the vacuum pressure is released, the panel 14 remains on the associated section 94 of the vehicle 12 via the magnetic cut-outs 36. Air valve 54 further includes a standoff 60 that is attached to the base 52 at a first end and integrally formed with the exterior portion 14a of the panel 14, at a second end.

Means are provided for attaching at least a portion of the panels 14 to the suction cup 50 such as epoxy, integral formation, but preferably consists of the standoff 60 that attaches the suction cup 50 to the panel 14 and further provides protection for the valve stem 54 of the air valve because the standoff 60 is disposed around the valve stem 56. As shown in FIGS. 1 and 3, a sealed cover 62 is also attached to the panel 14 and has a first flange 64a and a second flange 64b disposed below the first flange 64a. The seal cover 62 is for sealing the air valve 54 from the environment when traversing the off-road setting. An annular groove 66 is formed in the panel 14 for receiving the second flange 64b of the seal cover 62 therein. The seal cover 62 is held in place by a snap fit into the panel 14 and can be removed by applying an upward force on the first flange 64a to release the seal cover 62.

Preferably, the panels 14 for shielding sections 94 of the vehicle 12 are comprised of a non-porous, non-fibrous plastic material to keep water and small particles from penetrating the panels 14 and thereby coming in contact with the sections 94 of the vehicle 12. Preferably, the non-porous, non-fibrous plastic material consists of Poly-Vinyl Chloride ("PVC").

As shown in FIG. 1, the present invention further includes a system 10 for shielding the plurality of sections 94 of the vehicle 12. The system 10 includes at least one panel for shielding each of the plurality of sections 94. Each panel 14 includes an exterior portion 14a, and interior portion 14b, and a lip 38 disposed around the interior portion 14b. A magnetic cut-out 36 is attached to the hp 38 for magnetically securing the panel 14 to one of the plurality of sections 94 of the vehicle 12. The system 10 further includes at least one suction cup 50 disposed on the interior portion 14b of the panel 14. The at least one suction cup 50 is for further securing the panel 14 to one of the plurality of sections 94 of the vehicle 12 via vacuum pressure contained within the suction cup 50 when applied to one of the sections 94 of the vehicle 12. The panels 14 in the present system 12 may cover one or all of the sections of the vehicle 12 depending upon a particular application in the off-road environment. For example, if vehicle 12 was traversing an off-road environment that had only short underbrush or bushes, the roof panel 90 would not have to be attached to the roof 34 of the vehicle 12. Likewise, the hood panel 92 would also not have to be attached to the hood 22 of the vehicle 12. The system 10 of the present invention further includes means for releasably securing the at least one suction cup 50 to one of the plurality of sections 94 of the vehicle 12. The means for releasably securing the at least one section cup 50 to one of the plurality of sections 94 of the vehicle 12 includes an air valve 54 attached to the at least one suction cup 50 and that is in air flow communication therewith for releasing the vacuum pressure contained within the suction cup 50.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A system for protecting the exterior of a vehicle, the system comprising:
   a panel having an exterior portion and an interior portion,
   a lip disposed substantially continuously around the perimeter of the interior portion of the panel;
   a magnetized member attached to the lip for magnetically securing the panel to the vehicle;
   at least one suction cup disposed on the interior portion of the panel for further securing the panel to the vehicle via negative pressure contained within the suction cup when applied to the vehicle;
   means for releasably securing the at least one suction cup to the vehicle comprising an air valve attached to the at least one suction cup and in air flow communication therewith; and
   a seal cover attached to the panel, the seal cover having a first flange and a second flange disposed below the first flange, the seal cover for protecting the air valve.

2. A system for shielding a vehicle, comprising:
   a panel having an exterior portion and an interior portion;
   a lip disposed around the interior portion of the panel;
   a magnetic cut-out attached to the lip for magnetically securing the panel to the vehicle;
   at least one suction cup disposed on the interior portion for further securing the panel to the vehicle via vacuum pressure contained within the suction cup when applied to the vehicle;
   a base integrally formed with the suction cup;
   an air valve attached to the base and being in air flow communication with the suction cup, the air valve comprising:
   a cap;
   a valve stem attached to the base and having a helical thread axially opposed to the base for screwingly attaching the cap thereon;
   a first air passageway to which the helical thread is formed around;
   a plunger disposed in the first air passageway;
   a spring;
   a piece attached to the plunger and mounted on the spring such that the plunger is spring loaded;
   a member mounted on the base and attached to the spring in axial opposition to the base; and
   a second air passageway formed in the base and extending through the air valve such that when the plunger is depressed and the piece displaced, the first air passageway is in communication with the second air passageway thereby releasing the vacuum pressure contained within the suction cup;
   a standoff having a first end and a second end, the standoff attached to the base at the first end and integrally formed with the panel at the second end;
   a seal cover attached to the panel, the seal cover having a first flange and a second flange disposed below the first flange, the seal cover for protecting the air valve; and
   an annular groove formed in the panel for receiving the second flange therein.

3. The system of claim 2 wherein the panel further comprises a non-porous, non-fibrous plastic material.

4. The panel of claim 3 wherein the non-porous, non-fibrous plastic material consists of PVC.

5. The panel of claim 2 wherein the magnetic cut-out prevents flow of air and seepage of moisture against the vehicle.

* * * * *

UNITED STATES PATENT AND TRADEMARK OFFICE
CERTIFICATE OF CORRECTION

PATENT NO. : 5,984,401
DATED : November 16, 1999
INVENTOR(S) : James David Hannah It is certified that error appears in the above-identified patent and that said Letters Patent is hereby corrected as shown below:

Column 2, line 10, before "provided", delete "if" and insert --is--.

Column 3, line 30, before "cup 50", delete "section" and insert --suction--.

Column 4, line 7, before "cup 50", delete "section" and insert --suction--.

Column 4, line 42, before "38", delete "hp" and insert --lip--.

Column 4, line 61, before "cup 50", delete "section" and insert --suction--.

Signed and Sealed this

Eighth Day of August, 2000

Attest:

Attesting Officer

Q. TODD DICKINSON

Director of Patents and Trademarks